United States Patent
Burroughs et al.

(10) Patent No.: US 11,226,600 B2
(45) Date of Patent: Jan. 18, 2022

(54) BUILDING CONTROL SYSTEM WITH LOAD CURTAILMENT OPTIMIZATION

(71) Applicant: Johnson Controls Technology Company, Auburn Hills, MI (US)

(72) Inventors: John H. Burroughs, Wauwatosa, WI (US); Andrew J. Przybylski, Franksville, WI (US); Michael J. Wenzel, Grafton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 198 days.

(21) Appl. No.: 16/555,591

(22) Filed: Aug. 29, 2019

(65) Prior Publication Data

US 2021/0063976 A1    Mar. 4, 2021

(51) Int. Cl.
*G05B 15/02* (2006.01)
*H02J 3/00* (2006.01)

(52) U.S. Cl.
CPC ............... *G05B 15/02* (2013.01); *H02J 3/00* (2013.01); *H02J 3/003* (2020.01); *H02J 2203/20* (2020.01)

(58) Field of Classification Search
CPC ............ G05B 15/02; G05B 2219/2642; H02J 2203/20; H02J 2310/12; H02J 3/00; H02J 3/003

See application file for complete search history.

(56) References Cited

U.S. PATENT DOCUMENTS

| | | |
|---|---|---|
| 5,497,452 A | 3/1996 | Shimizu et al. |
| 7,580,775 B2 | 8/2009 | Kulyk et al. |
| 7,894,946 B2 | 2/2011 | Kulyk et al. |
| 8,473,080 B2 | 6/2013 | Seem et al. |
| 8,527,108 B2 | 9/2013 | Kulyk et al. |
| 8,527,109 B2 | 9/2013 | Kulyk et al. |
| 8,918,223 B2 | 12/2014 | Kulyk et al. |
| 9,002,532 B2 | 4/2015 | Asmus |
| 9,110,647 B2 | 8/2015 | Kulyk et al. |

(Continued)

OTHER PUBLICATIONS

U.S. Appl. No. 15/900,459, filed Feb. 20, 2018, Johnson Controls Technology Company.

(Continued)

*Primary Examiner* — Yuhui R Pan
(74) *Attorney, Agent, or Firm* — Foley & Lardner LLP

(57) ABSTRACT

A system controlling equipment to serve energy loads of a building includes a cost function generator configured to obtain a cost function of decision variables representing an amount of resources consumed or produced by the equipment, an optimizer configured to perform a first optimization of the cost function subject to a first set of constraints defining first values of constraint variables to generate a first result defining first values of decision variables, a constraint modifier configured determine a cost gradient, recommend changes to constraint variables, and modify constraint variables to modified values in response to changes. The optimizer is configured to perform an optimization of the cost function subject to a second set of constraints to generate a second optimization result defining second values of the decision variables. The system includes a controller that operates equipment to consume or produce resources defined by second values of the decision variables.

20 Claims, 7 Drawing Sheets

(56) References Cited

U.S. PATENT DOCUMENTS

| | | |
|---|---|---|
| 9,235,657 B1 | 1/2016 | Wenzel et al. |
| 9,429,923 B2 | 8/2016 | Ward et al. |
| 9,436,179 B1 | 9/2016 | Turney et al. |
| 9,612,601 B2 | 4/2017 | Beyhaghi et al. |
| 9,696,054 B2 | 7/2017 | Asmus |
| 9,703,339 B2 | 7/2017 | Kulyk et al. |
| 9,778,639 B2 | 10/2017 | Boettcher et al. |
| 9,852,481 B1 | 12/2017 | Turney et al. |
| 9,982,903 B1 | 5/2018 | Ridder et al. |
| 10,007,259 B2 | 6/2018 | Turney et al. |
| 10,088,814 B2 | 10/2018 | Wenzel et al. |
| 10,101,730 B2 | 10/2018 | Wenzel et al. |
| 10,101,731 B2 | 10/2018 | Asmus et al. |
| 10,139,877 B2 | 11/2018 | Kulyk et al. |
| 10,175,681 B2 | 1/2019 | Wenzel et al. |
| 10,190,789 B2 | 1/2019 | Mueller et al. |
| 2002/0165671 A1* | 11/2002 | Middya .................. E21B 43/00 702/12 |
| 2015/0316901 A1 | 11/2015 | Wenzel et al. |
| 2015/0316907 A1 | 11/2015 | Elbsat et al. |
| 2016/0313751 A1 | 10/2016 | Risbeck et al. |
| 2016/0377306 A1 | 12/2016 | Drees et al. |
| 2017/0031962 A1 | 2/2017 | Turney et al. |
| 2017/0102162 A1 | 4/2017 | Drees et al. |
| 2017/0103483 A1 | 4/2017 | Drees et al. |
| 2017/0104336 A1 | 4/2017 | Elbsat et al. |
| 2017/0104342 A1 | 4/2017 | Elbsat et al. |
| 2017/0104343 A1 | 4/2017 | Elbsat et al. |
| 2017/0179716 A1 | 6/2017 | Vitullo et al. |
| 2017/0212488 A1 | 7/2017 | Kummer et al. |
| 2017/0241658 A1 | 8/2017 | Salsbury et al. |
| 2018/0004171 A1 | 1/2018 | Patel et al. |
| 2018/0004172 A1 | 1/2018 | Patel et al. |
| 2018/0004173 A1 | 1/2018 | Patel et al. |
| 2018/0011459 A1 | 1/2018 | Boettcher et al. |
| 2018/0075549 A1 | 3/2018 | Turney et al. |
| 2018/0196456 A1* | 7/2018 | ElBsat .................. G06Q 50/06 |
| 2018/0197253 A1 | 7/2018 | Elbsat et al. |
| 2018/0209674 A1 | 7/2018 | Ridder et al. |
| 2018/0209675 A1 | 7/2018 | Ridder |
| 2018/0254632 A1 | 9/2018 | Elbsat et al. |
| 2018/0259918 A1 | 9/2018 | Asmus et al. |
| 2018/0285800 A1 | 10/2018 | Wenzel et al. |
| 2018/0306459 A1 | 10/2018 | Turney |
| 2018/0313563 A1 | 11/2018 | Turney et al. |
| 2018/0314220 A1 | 11/2018 | Kumar et al. |
| 2018/0341255 A1 | 11/2018 | Turney et al. |
| 2018/0356770 A1 | 12/2018 | Elbsat et al. |
| 2018/0356782 A1 | 12/2018 | Elbsat et al. |
| 2018/0357577 A1 | 12/2018 | Elbsat et al. |
| 2019/0011145 A1 | 1/2019 | Willmott et al. |
| 2019/0020203 A1 | 1/2019 | Lang et al. |
| 2019/0025774 A1 | 1/2019 | Wenzel et al. |
| 2019/0032942 A1 | 1/2019 | Willmott et al. |
| 2019/0032943 A1 | 1/2019 | Willmott et al. |
| 2019/0032944 A1 | 1/2019 | Wenzel et al. |
| 2019/0032945 A1 | 1/2019 | Willmott et al. |
| 2019/0032947 A1 | 1/2019 | Willmott et al. |
| 2019/0032949 A1 | 1/2019 | Willmott et al. |
| 2019/0066236 A1 | 2/2019 | Wenzel |
| 2019/0079473 A1 | 3/2019 | Kumar et al. |
| 2019/0107825 A1 | 4/2019 | Wenzel et al. |
| 2019/0163213 A1 | 5/2019 | Ostrye et al. |
| 2019/0163216 A1 | 5/2019 | Ostrye |
| 2019/0213695 A1 | 7/2019 | Elbsat et al. |
| 2019/0219293 A1 | 7/2019 | Wenzel et al. |
| 2019/0245368 A1 | 8/2019 | Baumgartner et al. |

OTHER PUBLICATIONS

U.S. Appl. No. 15/921,955, filed Mar. 15, 2018, Johnson Controls Technology Company.
U.S. Appl. No. 15/953,324, filed Apr. 13, 2018, Johnson Controls Technology Company.
U.S. Appl. No. 16/040,698, filed Jul. 20, 2018, Johnson Controls Technology Company.
U.S. Appl. No. 16/178,361, filed Nov. 1, 2018, Johnson Controls Technology Company.
U.S. Appl. No. 16/223,746, filed Dec. 18, 2018, Johnson Controls Technology Company.
U.S. Appl. No. 16/223,901, filed Dec. 18, 2018, Johnson Controls Technology Company.
U.S. Appl. No. 16/240,028, filed Jan. 4, 2019, Alanqar et al.
U.S. Appl. No. 16/240,466, filed Jan. 4, 2019, Johnson Controls Technology Company.
U.S. Appl. No. 16/294,475, filed Mar. 6, 2019, Johnson Controls Technology Company.
U.S. Appl. No. 16/294,490, filed Mar. 6, 2019, Johnson Controls Technology Company.

* cited by examiner

BUILDING CONTROL SYSTEM WITH LOAD CURTAILMENT OPTIMIZATION

BACKGROUND

The present disclosure relates generally to a central plant or central energy facility configured to serve the energy loads of a building or campus. The present disclosure relates more particularly to a central plant with an asset allocator configured to determine an optimal distribution of the energy loads across various subplants of the central plant during curtailment periods.

A central plant typically includes multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

Some central plants are controlled based on a load profile that is generated to characterize the production and consumption of energy by the building. In the presence of a large building load, it may not be possible for a load profile to be met by existing building equipment. As a result, the load is curtailed by forcing the building in uncomfortable conditions.

SUMMARY

One implementation of the present disclosure is a controller including a processing circuit comprising processors and memory storing instructions that, when executed by the processors, cause the processors to perform operations. The operations include performing a first optimization of an objective function subject to a first constraint to generate a first optimization result, the first constraint defining a first value of a constraint variable, automatically modifying the constraint variable to have a modified value based on a gradient of an output of the objective function with respect to the constraint variable performing a second optimization of the objective function subject to a second constraint to generate a second optimization result, the second constraint defining the modified value of the constraint variable, and operating equipment in accordance with the second optimization result.

In some embodiments, The controller of claim 1, wherein the first optimization result comprises a first value for a dual variables representing the gradient with respect to one of the constraint variable.

In some embodiments, the constraint variable comprises a required load variable for a resource, the required load variable defining a production amount of one of the resource required by a building at each of a plurality of time steps.

In some embodiments, the operations further comprise modifying at least one of a plurality of required load variables to reduce an amount of one or more of a resource required by a building, thereby reducing a cost resulting from the second optimization of the objective function relative to the cost resulting from the first optimization of the objective function.

In some embodiments, the operations further comprise recommending the changes to one or more of the constraint variable in response to a determination that an amount of a resources required by a building exceeds a production amount of the resource capable of being produced by a subplant during a portion of a time period.

In some embodiments, the operations further comprise presenting, to a user on a user device, the gradient with respect to the constraint variable and a recommended change to the constraint variable based on the gradient associated therewith and modifying the constraint variable to have the modified value based on a user selection of the recommended change.

In some embodiments, the operations further comprise determining a gradient threshold value based on a user selection of one or more changes to the constraint variable and the gradient associated therewith, wherein the gradient threshold value defines a minimum gradient value by which the controller selects the one or more changes.

In some embodiments, the first optimization result includes first values for a dual variable, the dual variable representing the gradient of the cost with respect to one of the constraint variables.

In some embodiments, the constraint variables include a required load variable for each of the resources, the required load variable defining an amount of one of the resources required by the building at each of the time steps.

In some embodiments, modifying the constraint variable further comprises presenting, to a user on a user device, the gradient with respect to the constraint variable and modifying the constraint variable based on a user input defining the modified value to the constraint variable.

Another implementation of the present disclosure is a method for controlling a central plant operating to serve one or more energy loads of a building. The method comprises performing a first optimization of an objective function subject to a first constraint to generate a first optimization result, the first constraint defining a first value of a constraint variable, modifying the constraint variable to have a modified value based on a gradient of an output of the objective function with respect to the constraint variables, performing a second optimization of the objective function subject to a second constraint to generate a second optimization result, the second constraint defining the modified value of the constraint variable, and operating equipment in accordance with the second optimization result.

In some embodiments, performing the first optimization further comprises generating the first value for a dual variable representing the gradient of the cost with respect to one of the plurality of constraint variables.

In some embodiments, recommending changes to one or more of the plurality of constraint variables further comprises generating a cost savings expected to result from modifying one or more of the plurality of constraint variables.

In some embodiments, recommending changes to one or more constraint variables further comprises determining that a curtailment incentive is available in exchange for reducing the amount of one or more of the plurality of resources consumed by the building during a portion of the time period.

In some embodiments, modifying one or more of the plurality of constraint variables involves modifying the one or more of the plurality of constraints variables based on a user selection of one or more changes to the plurality of constraint variables.

In some embodiments, determining a gradient threshold value based on a user selection of one or more changes to the constraint variable and the gradient associated therewith, wherein the gradient threshold value defines a minimum gradient value by which the controller selects the one or more changes.

In some embodiments, modifying the constraint variable further involves comparing the gradient with the gradient threshold value to determine the modified value by which the constraint variable is modified.

In some embodiments, modifying the constraint variable further comprises presenting, to a user on a user device, the gradient with respect to the constraint variable and modifying the constraint variable based on a user input defining the modified value to the constraint variable.

In some embodiments, determining a gradient threshold value based on a user selection of one or more changes to the constraint variable and the gradient associated therewith, wherein the gradient threshold value defines a minimum gradient value by which the controller selects the one or more changes.

In some embodiments, modifying the constraint variable further involves comparing the gradient with the gradient threshold value to determine the modified value by which the constraint variable is modified.

In some embodiments, modifying the constraint variable further comprises presenting, to a user on a user device, the gradient with respect to the constraint variable and modifying the constraint variable based on a user input defining the modified value to the constraint variable.

Yet another implementation a control system for building equipment. The control system comprises a controller comprising a processing circuit comprising one or more processors and memory storing instructions that, when executed by the one or more processors, cause the one or more processors to perform operations comprising performing a first optimization of an objective function subject to a first constraint to generate a first optimization result, the first constraint defining a first value of a constraint variable, modifying the constraint variable to have a modified value based on a gradient of an output of the objective function with respect to the constraint variable performing a second optimization of the objective function subject to a second constraint to generate a second optimization result, the second constraint defining the modified value of the constraint variable, and operating equipment in accordance with the second optimization result.

In some embodiments, the constraint variable comprises a required load variable defining the amount of a resource required by the building equipment at each of a plurality of time steps.

In some embodiments, the operations further comprise modifying at least one of a plurality of required load variables to reduce an amount of one or more resources required by the building equipment, thereby reducing a cost resulting from the second optimization of the objective function relative to the cost resulting from the first optimization of the objective function.

In some embodiments, the operations further comprise recommending a change to the constraint variable in response to a determination that an amount of one or more resources required by the building equipment exceeds a production amount of the one or more resources capable of being produced during a portion of a time period.

In some embodiments, the memory stores one or more predetermined control actions used to determine a control signal based on an amount of load curtailment.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a central plant with an asset allocator and components thereof are shown, according to various exemplary embodiments. The asset allocator can be configured to manage energy assets such as central plant equipment, battery storage, and other types of equipment configured to serve the energy loads of a building. The asset allocator can determine an optimal distribution of heating, cooling, electricity, and energy loads across different subplants (i.e., equipment groups) of the central plant capable of producing that type of energy.

In some embodiments, the asset allocator is configured to control the distribution, production, storage, and usage of resources in the central plant. The asset allocator can be configured to minimize the economic cost (or maximize the economic value) of operating the central plant over a duration of an optimization period. The economic cost may be defined by a cost function $J(x)$ that expresses economic cost as a function of the control decisions made by the asset allocator. The cost function $J(x)$ may account for the cost of resources purchased from various sources, as well as the revenue generated by selling resources (e.g., to an energy grid) or participating in incentive programs.

In some embodiments, the asset allocator performs an optimization process determine an optimal set of control decisions for each time step within the optimization period. In some embodiments, one or more of the outputs of the optimization process is a definition of one or more constraint variables. The asset allocator may be configured to recommend changes to one or more of the constraint variables based on load curtailment, cost savings, or cost gradient of the constraint variables. In some embodiments, the asset allocator performs a second optimization including updated constraints based on the recommended changes to one or more of the constraint variables in order to further minimize energy consumption by the building and/or maximize economic value.

Building and HVAC System

Figure 1:
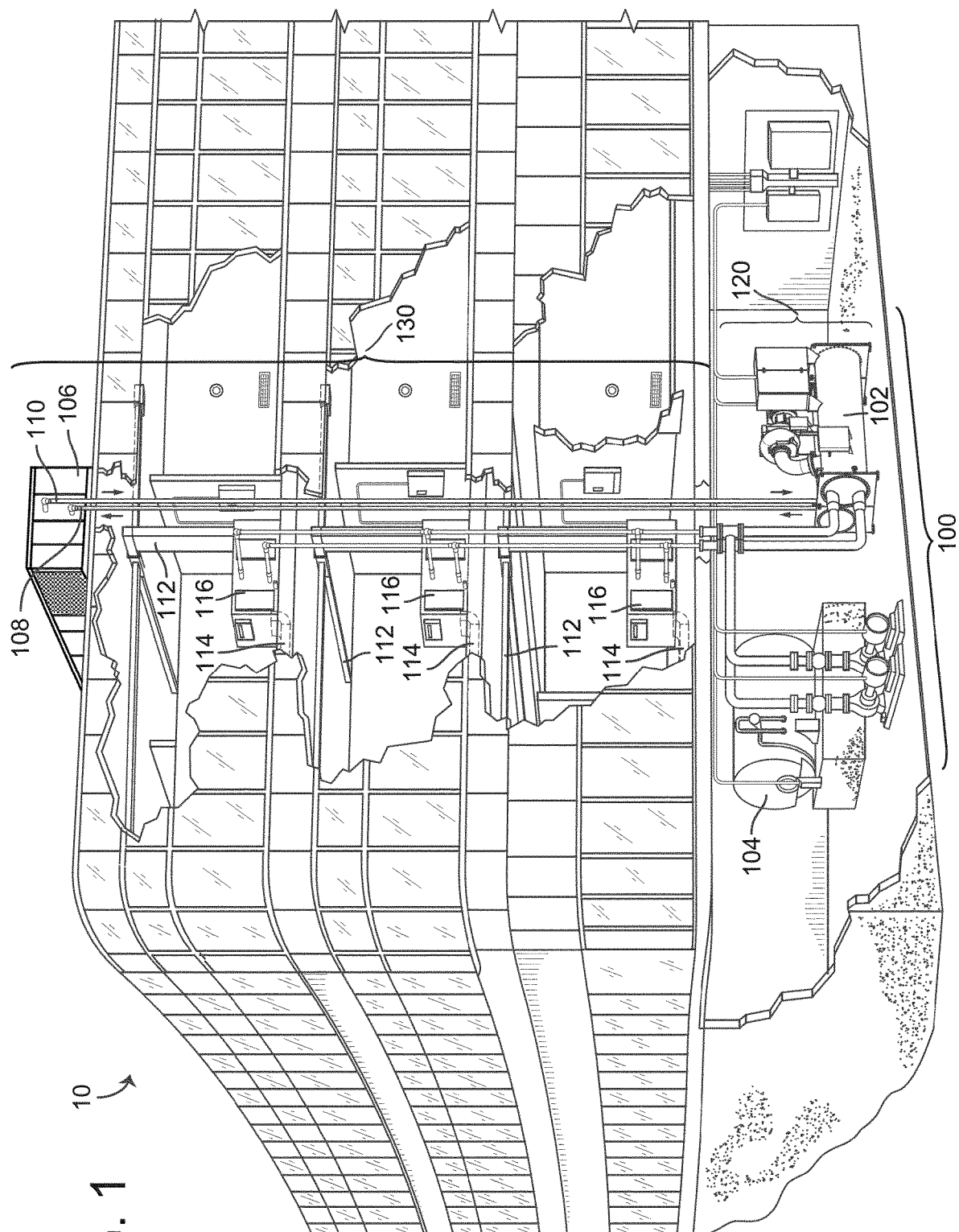
FIG. 1 is a drawing of a building equipped with a HVAC system, according to an exemplary embodiment.

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
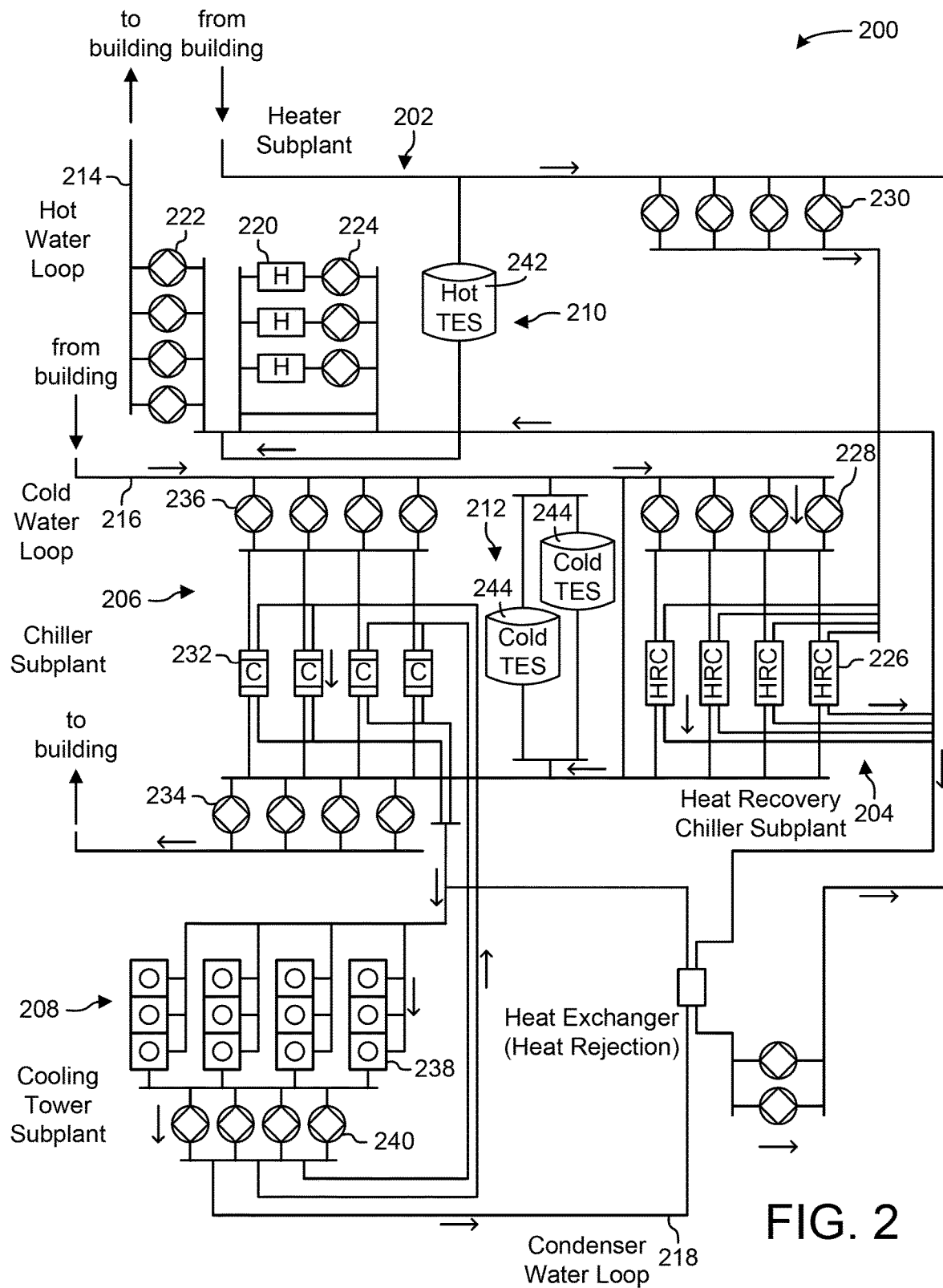
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Asset Allocation System

Figure 3:
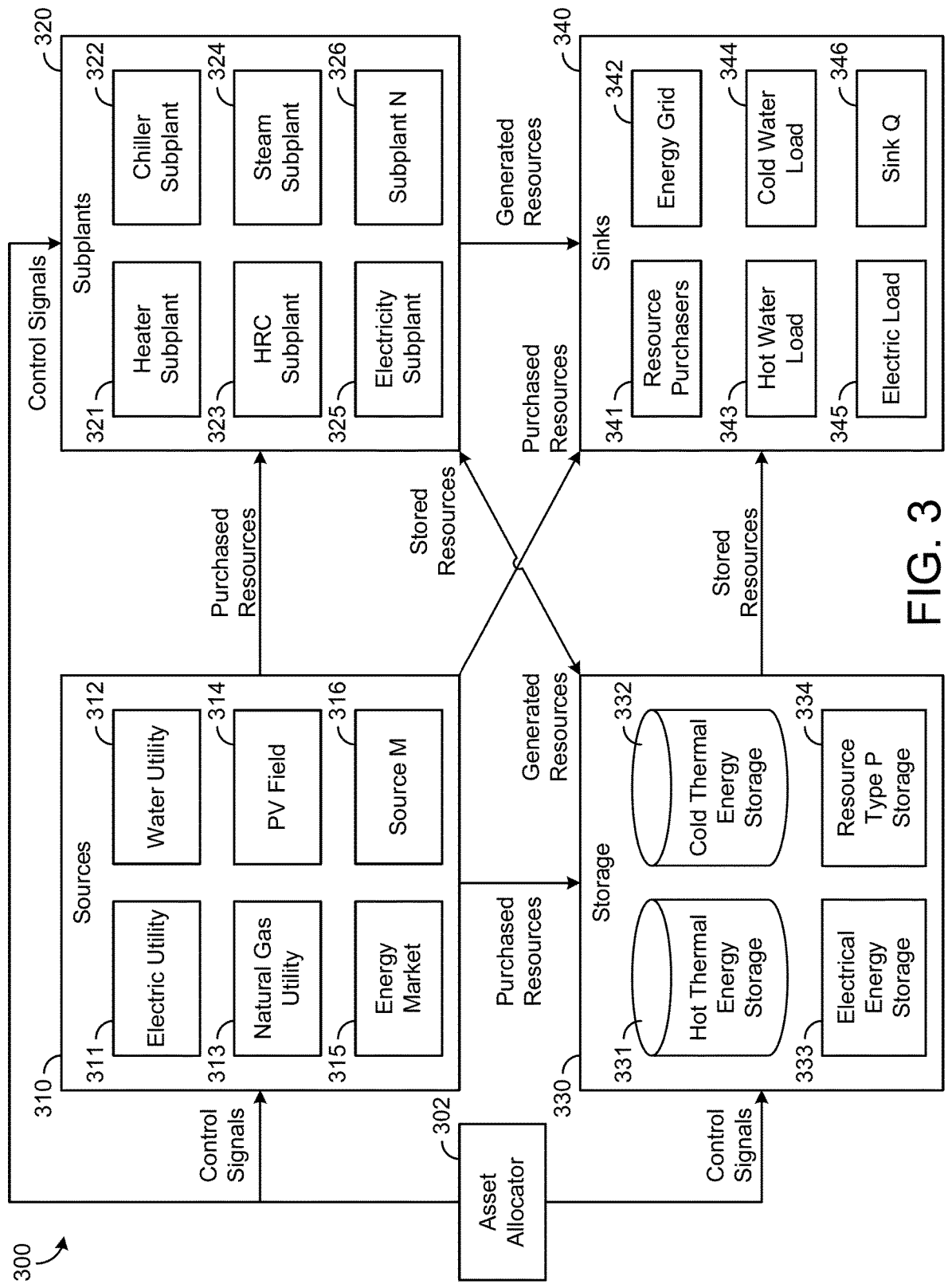
FIG. 3 is a block diagram of an asset allocation system including sources, subplants, storage, sinks, and an asset allocator configured to optimize the allocation of these assets, according to an exemplary embodiment.

Referring now to FIG. 3, a block diagram of an asset allocation system 300 is shown, according to an exemplary embodiment. Asset allocation system 300 can be configured to manage energy assets such as central plant equipment, battery storage, and other types of equipment configured to serve the energy loads of a building. Asset allocation system 300 can determine an optimal distribution of heating, cooling, electricity, and energy loads across different subplants (i.e., equipment groups) capable of producing that type of energy. In some embodiments, asset allocation system 300 is implemented as a component of central plant 200 and interacts with the equipment of central plant 200 in an online operational environment (e.g., performing real-time control of the central plant equipment).

Asset allocation system 300 is shown to include sources 310, subplants 320, storage 330, and sinks 340. These four categories of objects define the assets of a central plant and their interaction with the outside world. Sources 310 may include commodity markets or other suppliers from which resources such as electricity, water, natural gas, and other resources can be purchased or obtained. Sources 310 may provide resources that can be used by asset allocation system 300 to satisfy the demand of a building or campus. For example, sources 310 are shown to include an electric utility 311, a water utility 312, a natural gas utility 313, a photovoltaic (PV) field 314 (e.g., a collection of solar panels), an energy market 315, and source M 316, where M is the total number of sources 310. Resources purchased from sources 310 can be used by subplants 320 to produce generated resources (e.g., hot water, cold water, electricity, steam, etc.), stored in storage 330 for later use, or provided directly to sinks 340.

Subplants 320 are the main assets of a central plant. Subplants 320 are shown to include a heater subplant 321, a chiller subplant 322, a heat recovery chiller subplant 323, a steam subplant 324, an electricity subplant 325, and subplant N 326, where N is the total number of subplants 320. In some embodiments, subplants 320 include some or all of the subplants of central plant 200, as described with reference to FIG. 2. For example, subplants 320 can include heater subplant 202, heat recovery chiller subplant 204, chiller subplant 206, and/or cooling tower subplant 208.

Subplants 320 can be configured to convert resource types, making it possible to balance requested loads from the building or campus using resources purchased from sources 310. For example, heater subplant 321 may be configured to generate hot thermal energy (e.g., hot water) by heating water using electricity or natural gas. Chiller subplant 322 may be configured to generate cold thermal energy (e.g., cold water) by chilling water using electricity. Heat recovery chiller subplant 323 may be configured to generate hot thermal energy and cold thermal energy by removing heat from one water supply and adding the heat to another water supply. Steam subplant 324 may be configured to generate steam by boiling water using electricity or natural gas. Electricity subplant 325 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 320 may be provided by sources 310, retrieved from storage 330, and/or generated by other subplants 320. For example, steam subplant 324 may produce steam as an output resource. Electricity subplant 325 may include a steam turbine that uses the steam generated by steam subplant 324 as an input resource to generate electricity. The output resources produced by subplants 320 may be stored in storage 330, provided to sinks 340, and/or used by other subplants 320. For example, the electricity generated by electricity subplant 325 may be stored in electrical energy storage 333, used by chiller subplant 322 to generate cold thermal energy, used to satisfy the electric load 345 of a building, or sold to resource purchasers 341.

Storage 330 can be configured to store energy or other types of resources for later use. Each type of storage within storage 330 may be configured to store a different type of resource. For example, storage 330 is shown to include hot thermal energy storage 331 (e.g., one or more hot water storage tanks), cold thermal energy storage 332 (e.g., one or more cold thermal energy storage tanks), electrical energy storage 333 (e.g., one or more batteries), and resource type P storage 334, where P is the total number of storage 330. In some embodiments, storage 330 include some or all of the storage of central plant 200, as described with reference to FIG. 2. In some embodiments, storage 330 includes the heat capacity of the building served by the central plant. The resources stored in storage 330 may be purchased directly from sources or generated by subplants 320.

In some embodiments, storage 330 is used by asset allocation system 300 to take advantage of price-based demand response (PBDR) programs. PBDR programs encourage consumers to reduce consumption when generation, transmission, and distribution costs are high. PBDR programs are typically implemented (e.g., by sources 310) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 330 allows for the resources to be purchased at times when the resources are relatively less expensive (e.g., during non-peak electricity hours) and stored for use at times when the resources are relatively more expensive (e.g., during peak electricity hours). Storing resources in storage 330 also allows the resource demand of the building or campus to be shifted in time. For example, resources can be purchased from sources 310 at times when the demand for heating or cooling is low and immediately converted into hot or cold thermal energy by subplants 320. The thermal energy can be stored in storage 330 and retrieved at times when the demand for heating or cooling is high. This allows asset allocation system 300 to smooth the resource demand of the building or campus and reduces the maximum required capacity of subplants 320. Smoothing the demand also asset allocation system 300 to reduce the peak electricity consumption, which results in a lower demand charge.

In some embodiments, storage 330 is used by asset allocation system 300 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 310 or by an independent service operator (ISO). IBDR programs supplement traditional utility-owned generation, transmission, and distribution assets with additional options for modifying demand load curves. For example, stored energy can be sold to resource purchasers 341 or an energy grid 342 to supplement the energy generated by sources 310. In some instances, incentives for participating in an IBDR program vary based on how quickly a system can respond to a request to change power output/consumption. Faster responses may be compensated at a higher level. Advantageously, electrical energy storage 333 allows system 300 to quickly respond to a request for electric power by rapidly discharging stored electrical energy to energy grid 342.

Sinks 340 may include the requested loads of a building or campus as well as other types of resource consumers. For example, sinks 340 are shown to include resource purchasers 341, an energy grid 342, a hot water load 343, a cold water load 344, an electric load 345, and sink Q 346, where Q is the total number of sinks 340. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 340 over the optimization period can be supplied as an input to asset allocation system 300 or predicted by asset allocation system 300. Sinks 340 can receive resources directly from sources 310, from subplants 320, and/or from storage 330.

Still referring to FIG. 3, asset allocation system 300 is shown to include an asset allocator 302. Asset allocator 302 may be configured to control the distribution, production, storage, and usage of resources in asset allocation system 300. In some embodiments, asset allocator 302 performs an optimization process determine an optimal set of control decisions for each time step within an optimization period. The control decisions may include, for example, an optimal amount of each resource to purchase from sources 310, an optimal amount of each resource to produce or convert using subplants 320, an optimal amount of each resource to store or remove from storage 330, an optimal amount of each resource to sell to resources purchasers 341 or energy grid 340, and/or an optimal amount of each resource to provide to other sinks 340. In some embodiments, the control decisions include an optimal amount of each input resource and output resource for each of subplants 320.

In some embodiments, asset allocator 302 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 310, used or produced by subplants 320, stored or discharged by storage 330, or consumed by sinks 340. For example, water may be considered a resource that is consumed by chillers, heaters, or cooling towers during operation. This general concept of a resource can be extended to chemical processing plants where one of the resources is the product that is being produced by the chemical processing plat.

Asset allocator 302 can be configured to operate the equipment of asset allocation system 300 to ensure that a resource balance is maintained at each time step of the optimization period. This resource balance is shown in the following equation:

$$\sum x_{time} = 0 \, \forall resources, \forall time \in horizon$$

where the sum is taken over all producers and consumers of a given resource (i.e., all of sources 310, subplants 320, storage 330, and sinks 340) and time is the time index. Each time element represents a period of time during which the resource productions, requests, purchases, etc. are assumed constant. Asset allocator 302 may ensure that this equation is satisfied for all resources regardless of whether that resource is required by the building or campus. For example, some of the resources produced by subplants 320 may be intermediate resources that function only as inputs to other subplants 320.

In some embodiments, the resources balanced by asset allocator 302 include multiple resources of the same type (e.g., multiple chilled water resources, multiple electricity resources, etc.). Defining multiple resources of the same type may allow asset allocator 302 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 302 to ensure that the resource balance is satisfied for each cold water resource without attempting to allocate resources in a way that is physically impossible (e.g., storing the output of chiller A in cold water storage tank B, etc.).

Asset allocator 302 may be configured to minimize the economic cost (or maximize the economic value) of operating asset allocation system 300 over the duration of the optimization period. The economic cost may be defined by a cost function J(x) that expresses economic cost as a function of the control decisions made by asset allocator 302. The cost function J(x) may account for the cost of resources purchased from sources 310, as well as the revenue generated by selling resources to resource purchasers 341 or energy grid 342 or participating in incentive programs. The cost optimization performed by asset allocator 302 can be expressed as:

$$\operatorname*{argmin}_{x} J(x)$$

where J(x) is defined as follows:

$$J(x) = \sum_{sources} \sum_{horizon} \text{cost}(\text{purchase}_{resouces,time}, time) - \sum_{incentives} \sum_{horizon} \text{revenue}(ReservationAmount)$$

The first term in the cost function J(x) represents the total cost of all resources purchased over the optimization horizon. Resources can include, for example, water, electricity, natural gas, or other types of resources purchased from a utility or other source 310. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 320 and storage 330 may include equipment that can be controlled by asset allocator 302 to optimize the performance of asset allocation system 300. Subplant equipment may include, for example, heating devices, chillers, heat recovery heat exchangers, cooling towers, energy storage devices, pumps, valves, and/or other devices of subplants 320 and storage 330. Individual devices of subplants 320 can be turned on or off to adjust the resource production of each subplant 320. In some embodiments, individual devices of subplants 320 can be operated at variable capacities (e.g., operating a chiller at 10% capacity or 60% capacity) according to an operating setpoint received from asset allocator 302. Asset allocator 302 can control the equipment of subplants 320 and storage 330 to adjust the amount of each resource purchased, consumed, and/or produced by system 300.

In some embodiments, asset allocator 302 optimizes the cost function J(x) subject to the following constraint, which guarantees the balance between resources purchased, produced, discharged, consumed, and requested over the optimization horizon:

$$\sum_{sources} \text{purchase}_{resouces,time} + \\ \sum_{subplants} \text{produces}(x_{internal,time}, x_{external,time}, v_{uncontrolled,time}) - \\ \sum_{subplants} \text{consumes}(x_{internal,time}, x_{external,time}, v_{uncontrolled,time}) + \\ \sum_{storages} \text{discharges}_{resources}(x_{internal,time}, x_{external,time}) - \\ \sum_{sinks} \text{requests}_{resources} = 0$$

$\forall$ resources, $\forall$ time $\in$ horizon where $x_{internal,time}$ includes internal decision variables (e.g., load allocated to each component of asset allocation system 300), $x_{external,time}$ includes external decision variables (e.g., condenser water return temperature or other shared variables across subplants 320), and $v_{uncontrolled,time}$ includes uncontrolled variables (e.g., weather conditions).

The first term in the previous equation represents the total amount of each resource (e.g., electricity, water, natural gas, etc.) purchased from each source 310 over the optimization horizon. The second and third terms represent the total production and consumption of each resource by subplants 320 over the optimization horizon. The fourth term represents the total amount of each resource discharged from storage 330 over the optimization horizon. Positive values indicate that the resource is discharged from storage 330, whereas negative values indicate that the resource is charged or stored. The fifth term represents the total amount of each resource requested by sinks 340 over the optimization horizon. Accordingly, this constraint ensures that the total amount of each resource purchased, produced, or discharged from storage 330 is equal to the amount of each resource consumed, stored, or provided to sinks 340.

In some embodiments, additional constraints exist on the regions in which subplants 320 can operate. Examples of such additional constraints include the acceptable space (i.e., the feasible region) for the decision variables given the uncontrolled conditions, the maximum amount of a resource that can be purchased from a given source 310, and any number of plant-specific constraints that result from the mechanical design of the plant.

Asset allocator 302 may include a variety of features that enable the application of asset allocator 302 to nearly any central plant, central energy facility, combined heating and cooling facility, or combined heat and power facility. These features include broadly applicable definitions for subplants 320, sinks 340, storage 330, and sources 310; multiples of the same type of subplant 320 or sink 340; subplant resource connections that describe which subplants 320 can send resources to which sinks 340 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high-level airside models. Incorporation of these features may allow asset allocator 302 to support a majority of the central energy facilities that will be seen in the future. Additionally, it will be possible to rapidly adapt to the inclusion of new subplant types. Some of these features are described in greater detail below.

Broadly applicable definitions for subplants 320, sinks 340, storage 330, and sources 310 allow each of these components to be described by the mapping from decision variables to resources consume and resources produced. Resources and other components of system 300 do not need to be "typed," but rather can be defined generally. The mapping from decision variables to resource consumption and production can change based on extrinsic conditions. Asset allocator 302 can solve the optimization problem by simply balancing resource use and can be configured to solve in terms of consumed resource 1, consumed resource 2, produced resource 1, etc., rather than electricity consumed, water consumed, and chilled water produced. Such an interface at the high-level allows for the mappings to be injected into asset allocation system 300 rather than needing them hard coded. Of course, "typed" resources and other components of system 300 can still exist in order to generate the mapping at run time, based on equipment out of service.

In some instances, constraints arise due to mechanical problems after an energy facility has been built. Accordingly, these constraints are site specific and are often not incorporated into the main code for any of subplants 320 or the high-level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Central Plant Controller

Figure 4:
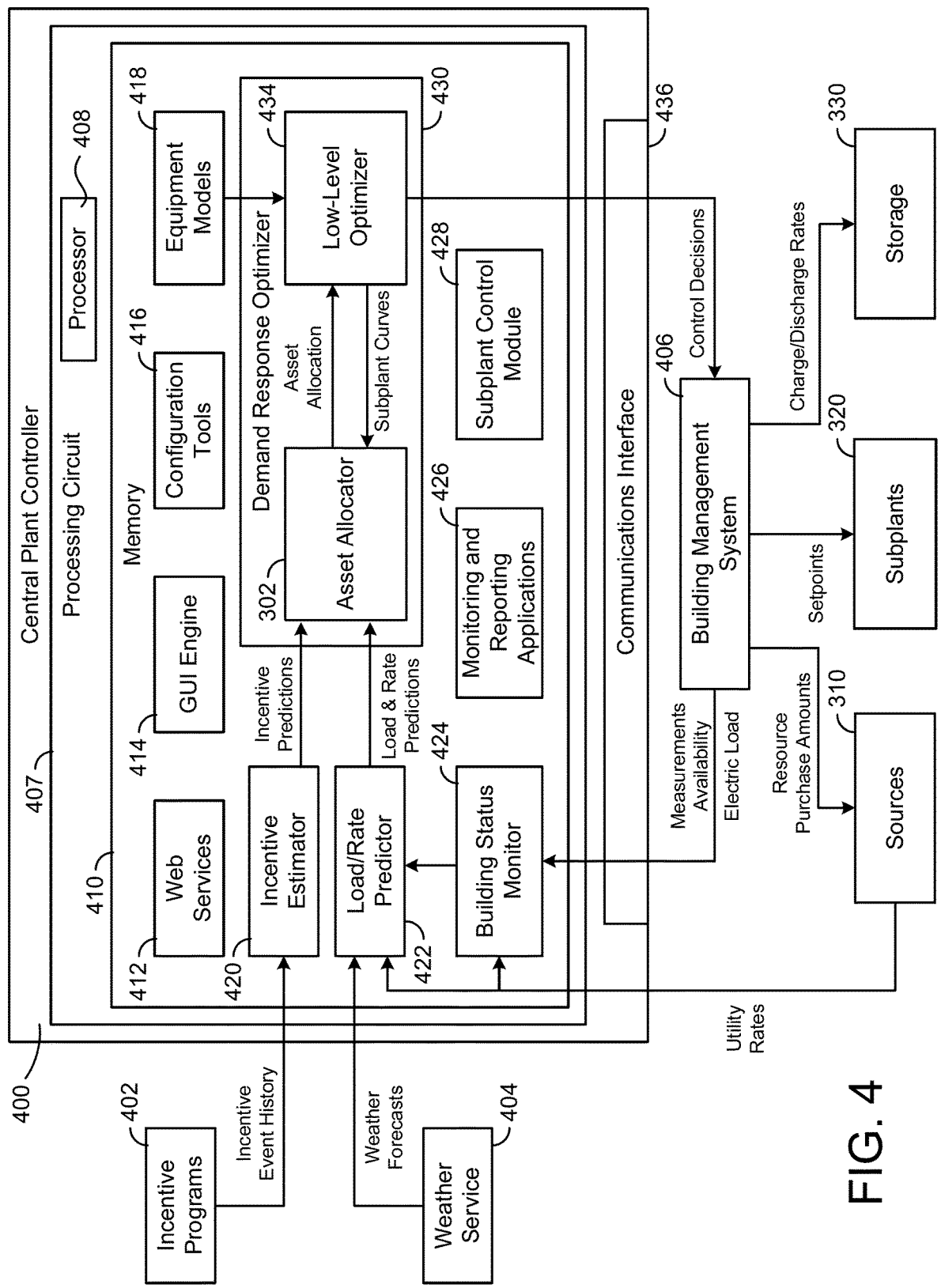
FIG. 4 is a block diagram of a central plant controller in which the asset allocator of FIG. 4 can be implemented, according to an exemplary embodiment.

Referring now to FIG. 4, a block diagram of a central plant controller 400 in which asset allocator 302 can be implemented is shown, according to an exemplary embodiment. In various embodiments, central plant controller 400 can be configured to monitor and control central plant 200, asset allocation system 300, and various components thereof (e.g., sources 310, subplants 320, storage 330, sinks 340, etc.). Central plant controller 400 is shown providing control decisions to a building management system (BMS) 406. The control decisions provided to BMS 406 may include resource purchase amounts for sources 310, setpoints for subplants 320, and/or charge/discharge rates for storage 330.

In some embodiments, BMS 406 is the same or similar to the BMS described with reference to FIG. 1. BMS 406 may be configured to monitor conditions within a controlled building or building zone. For example, BMS 406 may receive input from various sensors (e.g., temperature sensors, humidity sensors, airflow sensors, voltage sensors, etc.) distributed throughout the building and may report building conditions to central plant controller 400. Building conditions may include, for example, a temperature of the building or a zone of the building, a power consumption (e.g., electric load) of the building, a state of one or more actuators configured to affect a controlled state within the building, or other types of information relating to the controlled building. BMS 406 may operate subplants 320 and storage 330 to affect the monitored conditions within the building and to serve the thermal energy loads of the building.

BMS 406 may receive control signals from central plant controller 400 specifying on/off states, charge/discharge rates, and/or setpoints for the subplant equipment. BMS 406 may control the equipment (e.g., via actuators, power relays, etc.) in accordance with the control signals provided by central plant controller 400. For example, BMS 406 may operate the equipment using closed loop control to achieve the setpoints specified by central plant controller 400. In various embodiments, BMS 406 may be combined with central plant controller 400 or may be part of a separate building management system. According to an exemplary embodiment, BMS 406 is a METASYS® brand building management system, as sold by Johnson Controls, Inc.

Central plant controller 400 may monitor the status of the controlled building using information received from BMS 406. Central plant controller 400 may be configured to predict the thermal energy loads (e.g., heating loads, cooling loads, etc.) of the building for plurality of time steps in an optimization period (e.g., using weather forecasts from a weather service 404). Central plant controller 400 may also predict the revenue generation potential of incentive based demand response (IBDR) programs using an incentive event history (e.g., past clearing prices, mileage ratios, event probabilities, etc.) from an incentive programs 402. Central plant controller 400 may generate control decisions that optimize the economic value of operating central plant 200 over the duration of the optimization period subject to constraints on the optimization process (e.g., energy balance constraints, load satisfaction constraints, etc.). The optimization process performed by central plant controller 400 is described in greater detail below.

In some embodiments, central plant controller 400 is integrated within a single computer (e.g., one server, one housing, etc.). In various other exemplary embodiments, central plant controller 400 can be distributed across multiple servers or computers (e.g., that can exist in distributed locations). In another exemplary embodiment, central plant controller 400 may be integrated with a smart building manager that manages multiple building systems and/or combined with BMS 406.

Central plant controller 400 is shown to include a communications interface 436 and a processing circuit 407. Communications interface 436 may include wired or wireless interfaces (e.g., jacks, antennas, transmitters, receivers, transceivers, wire terminals, etc.) for conducting data communications with various systems, devices, or networks. For example, communications interface 436 may include an Ethernet card and port for sending and receiving data via an Ethernet-based communications network and/or a Wi-Fi transceiver for communicating via a wireless communications network. Communications interface 436 may be configured to communicate via local area networks or wide area networks (e.g., the Internet, a building WAN, etc.) and may use a variety of communications protocols (e.g., BACnet, IP, LON, etc.).

Communications interface 436 may be a network interface configured to facilitate electronic data communications between central plant controller 400 and various external systems or devices (e.g., BMS 406, subplants 320, storage 330, sources 310, etc.). For example, central plant controller 400 may receive information from BMS 406 indicating one or more measured states of the controlled building (e.g., temperature, humidity, electric loads, etc.) and one or more states of subplants 320 and/or storage 330 (e.g., equipment status, power consumption, equipment availability, etc.). Communications interface 436 may receive inputs from BMS 406, subplants 320, and/or storage 330 and may provide operating parameters (e.g., on/off decisions, setpoints, etc.) to subplants 320 and storage 330 via BMS 406. The operating parameters may cause subplants 320 and storage 330 to activate, deactivate, or adjust a setpoint for various devices thereof.

Still referring to FIG. 4, processing circuit 407 is shown to include a processor 408 and memory 410. Processor 408 may be a general purpose or specific purpose processor, an application specific integrated circuit (ASIC), one or more field programmable gate arrays (FPGAs), a group of processing components, or other suitable processing components. Processor 408 may be configured to execute computer code or instructions stored in memory 410 or received from other computer readable media (e.g., CDROM, network storage, a remote server, etc.).

Memory 410 may include one or more devices (e.g., memory units, memory devices, storage devices, etc.) for storing data and/or computer code for completing and/or facilitating the various processes described in the present disclosure. Memory 410 may include random access memory (RAM), read-only memory (ROM), hard drive storage, temporary storage, non-volatile memory, flash memory, optical memory, or any other suitable memory for storing software objects and/or computer instructions. Memory 410 may include database components, object code components, script components, or any other type of information structure for supporting the various activities and information structures described in the present disclosure. Memory 410 may be communicably connected to processor 408 via processing circuit 407 and may include computer code for executing (e.g., by processor 408) one or more processes described herein.

Memory 410 is shown to include a building status monitor 424. Central plant controller 400 may receive data regarding the overall building or building space to be heated or cooled by system 300 via building status monitor 424. In an exemplary embodiment, building status monitor 424 may include a graphical user interface component configured to provide graphical user interfaces to a user for selecting building requirements (e.g., overall temperature parameters, selecting schedules for the building, selecting different temperature levels for different building zones, etc.).

Central plant controller 400 may determine on/off configurations and operating setpoints to satisfy the building requirements received from building status monitor 424. In some embodiments, building status monitor 424 receives, collects, stores, and/or transmits cooling load requirements, building temperature setpoints, occupancy data, weather data, energy data, schedule data, and other building parameters. In some embodiments, building status monitor 424 stores data regarding energy costs, such as pricing information available from sources 310 (energy charge, demand charge, etc.).

Still referring to FIG. 4, memory 410 is shown to include a load/rate predictor 422. Load/rate predictor 422 may be configured to predict the thermal energy loads ($\hat{\ell}_k$) of the building or campus for each time step k (e.g., k=1 . . . n) of an optimization period. Load/rate predictor 422 is shown receiving weather forecasts from a weather service 404. In some embodiments, load/rate predictor 422 predicts the thermal energy loads $\hat{\ell}_k$ as a function of the weather forecasts. In some embodiments, load/rate predictor 422 uses feedback from BMS 406 to predict loads $\hat{\ell}_k$. Feedback from BMS 406 may include various types of sensory inputs (e.g., temperature, flow, humidity, enthalpy, etc.) or other data relating to the controlled building (e.g., inputs from a HVAC system, a lighting control system, a security system, a water system, etc.).

Still referring to FIG. 4, memory 410 is shown to include an incentive estimator 420. Incentive estimator 420 may be configured to estimate the revenue generation potential of participating in various incentive-based demand response (IBDR) programs. In some embodiments, incentive estimator 420 receives an incentive event history from incentive programs 402. The incentive event history may include a history of past IBDR events from incentive programs 402. An IBDR event may include an invitation from incentive programs 402 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 420 may use the incentive event history to estimate IBDR event probabilities during the optimization period.

Incentive estimator 420 is shown providing incentive predictions to a demand response optimizer 430. The incentive predictions may include the estimated IBDR probabilities, estimated participation requirements, an estimated amount of revenue from participating in the estimated IBDR events, and/or any other attributes of the predicted IBDR events. Demand response optimizer 430 may use the incentive predictions along with the predicted loads $\hat{\ell}_k$ and utility rates from load/rate predictor 422 to determine an optimal set of control decisions for each time step within the optimization period.

Still referring to FIG. 4, memory 410 is shown to include a demand response optimizer 430. Demand response optimizer 430 may perform a cascaded optimization process to optimize the performance of asset allocation system 300. For example, demand response optimizer 430 is shown to include asset allocator 302 and a low-level optimizer 434. Asset allocator 302 may control an outer (e.g., subplant level) loop of the cascaded optimization. Asset allocator 302 may determine an optimal set of control decisions for each time step in the prediction window in order to optimize (e.g., maximize) the value of operating asset allocation system 300. Control decisions made by asset allocator 302 may include, for example, load setpoints for each of subplants 320, charge/discharge rates for each of storage 330, and resource purchase amounts for each type of resource purchased from sources 310. In other words, the control decisions may define resource allocation at each time step. The control decisions made by asset allocator 302 are based on the statistical estimates of incentive event probabilities and revenue generation potential for various IBDR events as well as the load and rate predictions.

Low-level optimizer 434 may control an inner (e.g., equipment level) loop of the cascaded optimization. Low-level optimizer 434 may determine how to best run each subplant at the load setpoint determined by asset allocator 302. For example, low-level optimizer 434 may determine on/off states and/or operating setpoints for various devices of the subplant equipment in order to optimize (e.g., minimize) the energy consumption of each subplant while meeting the resource allocation setpoint for the subplant. In some embodiments, low-level optimizer 434 receives actual incentive events from incentive programs 402. Low-level optimizer 434 may determine whether to participate in the incentive events based on the resource allocation set by asset allocator 302. For example, if insufficient resources have been allocated to a particular IBDR program by asset allocator 302 or if the allocated resources have already been used, low-level optimizer 434 may determine that asset allocation system 300 will not participate in the IBDR program and may ignore the IBDR event. However, if the required resources have been allocated to the IBDR program and are available in storage 330, low-level optimizer 434 may determine that system 300 will participate in the IBDR program in response to the IBDR event. The cascaded optimization process performed by demand response optimizer 630 is described in greater detail in U.S. patent application Ser. No. 15/247,885.

In some embodiments, low-level optimizer 434 generates and provides subplant curves to asset allocator 302. Each subplant curve may indicate an amount of resource consumption by a particular subplant (e.g., electricity use measured in kW, water use measured in L/s, etc.) as a function of the subplant load. In some embodiments, low-level optimizer 434 generates the subplant curves by running the low-level optimization process for various combinations of subplant loads and weather conditions to generate multiple data points. Low-level optimizer 434 may fit a curve to the data points to generate the subplant curves. In other embodiments, low-level optimizer 434 provides the data points asset allocator 302 and asset allocator 302 generates the subplant curves using the data points. Asset allocator 302 may store the subplant curves in memory for use in the high-level (i.e., asset allocation) optimization process.

Still referring to FIG. 4, memory 410 is shown to include a subplant control module 428. Subplant control module 428 may store historical data regarding past operating statuses, past operating setpoints, and instructions for calculating and/or implementing control parameters for subplants 320 and storage 330. Subplant control module 428 may also receive, store, and/or transmit data regarding the conditions of individual devices of the subplant equipment, such as operating efficiency, equipment degradation, a date since last service, a lifespan parameter, a condition grade, or other device-specific data. Subplant control module 428 may receive data from subplants 320, storage 330, and/or BMS 406 via communications interface 436. Subplant control module 428 may also receive and store on/off statuses and operating setpoints from low-level optimizer 434.

Data and processing results from demand response optimizer 430, subplant control module 428, or other modules of central plant controller 400 may be accessed by (or pushed to) monitoring and reporting applications 426. Monitoring and reporting applications 426 may be configured to generate real time "system health" dashboards that can be viewed and navigated by a user (e.g., a system engineer). For example, monitoring and reporting applications 426 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 4, central plant controller 400 may include one or more GUI servers, web services 412, or GUI engines 414 to support monitoring and reporting applications 426. In various embodiments, applications 426, web services 412, and GUI engine 414 may be provided as separate components outside of central plant controller 400 (e.g., as part of a smart building manager). Central plant controller 400 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 400 may be configured to provide the results of any such processing to other databases, tables, XML files, or other data structures for further querying, calculation, or access by, for example, external monitoring and reporting applications.

Central plant controller 400 is shown to include configuration tools 416. Configuration tools 416 can allow a user to define (e.g., via graphical user interfaces, via prompt-driven "wizards," etc.) how central plant controller 400 should react to changing conditions in the energy storage subsystems. In an exemplary embodiment, configuration tools 416 allow a user to build and store condition-response scenarios that can cross multiple energy storage system devices, multiple building systems, and multiple enterprise control applications (e.g., work order management system applications, entity resource planning applications, etc.). For example, configuration tools 416 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 416 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Asset Allocator Components

Figure 5:
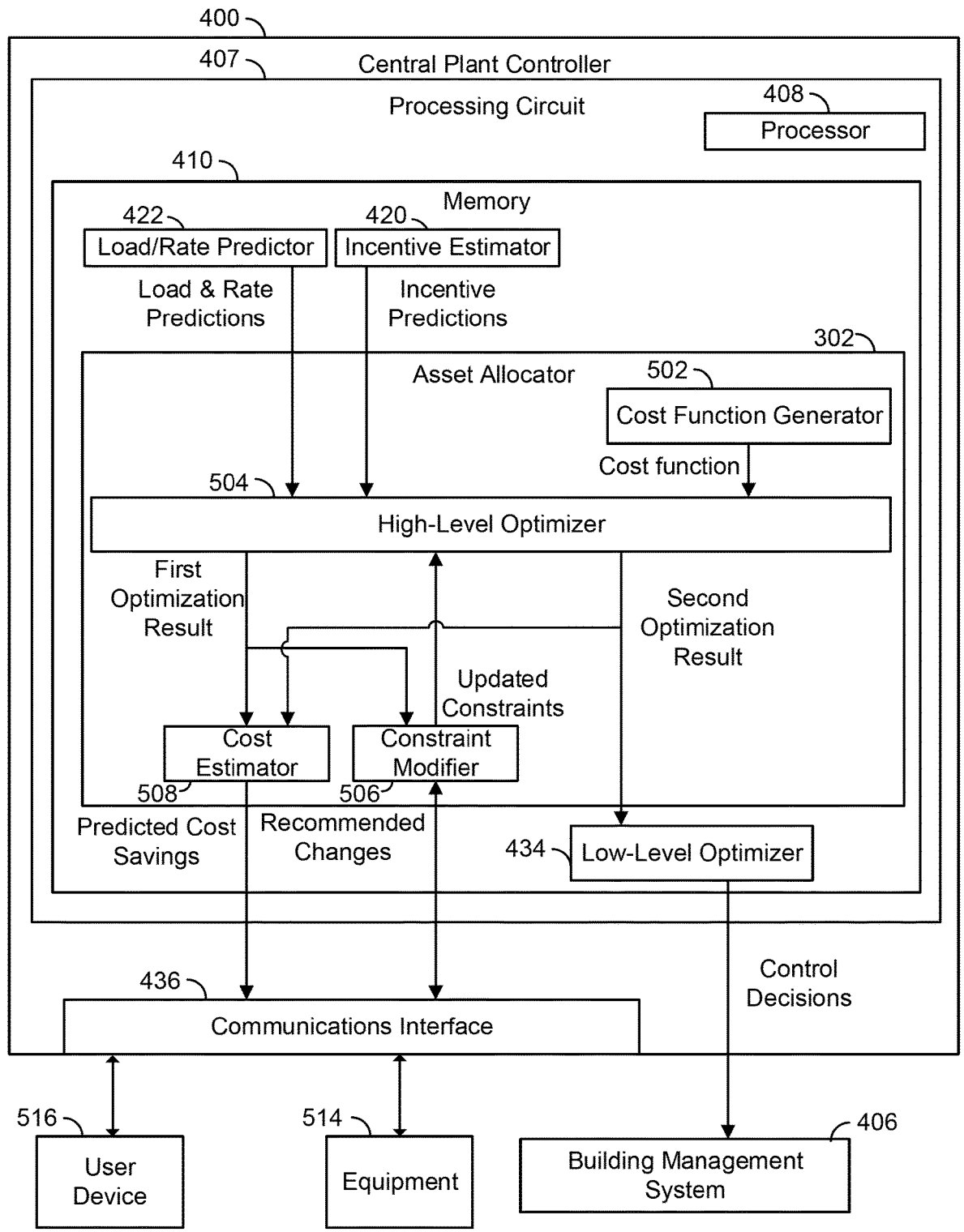
FIG. 5 is a block diagram of the asset allocator included in the central plant of FIG. 4, according to an exemplary embodiment.

Referring now to FIG. 5, a detailed view of components included in asset allocator 302 as implemented in the central plant controller 400 is shown, according to an exemplary embodiment. Asset allocator 302 is shown to include a cost function generator 502. Cost function generator 502 may be configured to generate a cost function J(x). As previously described, the cost function cost function J(x) may account for the cost of resources purchased from various sources, as well as the revenue generated by selling resources (e.g., to an energy grid) or participating in incentive programs. Additionally, the cost function J(x) may define a cost of operating central plant 200 over a time period. The cost function 1(x) generated by cost function generator 502 is shown to be transmitted to high-level optimizer 504.

Asset allocator 302 is also shown to include a high-level optimizer 504. Methods and techniques of high-level optimization which can be performed by high-level optimizer 504 are described in greater detail in U.S. patent application Ser. No. 15/473,496 filed Mar. 29, 2017, the entire disclosure of which is incorporated by reference herein. In general, high-level optimizer 504 performs an optimization of the cost function J(x) transmitted to high-level optimizer 504 from cost function generator 502 subject to a set of constraints to generate an optimization result. In some embodiments, the set of constraints used by high-level optimizer 504 to generate an optimization result is defined by a required load value determine from load/rate predictions transmitted to high-level optimizer 504 from load/rate predictor 422. In other embodiments, the set of constraints used by high-level optimizer 504 to generate an optimization result is defined by incentive predictions transmitted to high-level optimizer 504 from inventive estimator 420.

In some embodiments, high-level optimizer 504 is configured to drive the cost defined by the cost function J(x) to a minimum value subject to the set of constraints. In some embodiments, the set of constraints used by high-level optimizer 504 defines a set of constraint variables which include one or more required load variables received from load/rate predictor 422 and/or incentive predictions received from incentive estimator 420. The one or more required load variables may be defined by the amount of each of the resources (e.g., chilled water, hot water, etc.) required by a building. Further, in some embodiments, high-level optimizer 504 is configured to generate at least one dual variable as a result of an optimization process. High-level optimizer 504 may generate the dual variables by calculating the partial derivative of the cost function J(x) with respect to each constraint variable at the optimal operating point defined by the first optimization result. As such, the dual variable represents a gradient of the cost function with respect to a particular constrain variable.

Still referring to FIG. 5, asset allocator 302 is also shown to include constraint modifier 506. As will be described in greater detail below, constraint modifier 506 may be configured to determine a gradient of the cost with respect to each of the constraint variables, recommend changes to one or more of the constraint variables, and modify one or more of the constraint variables based on changes to one or more of the constraint variables to produce modified constraint variables. In general, constraint modifier 506 may be configured to analyze a first optimization result transmitted to constraint modifier 506 from high-level optimizer 506 and generate various recommended changes to the constraint variables. In some embodiments, the some or all of the recommended changes may be generated for use in a second optimization by high-level optimizer 504 in order to generate a second optimization result of lower cost and/or reduced required load. In some embodiments, constraint modifier 506 presents the gradient of the cost with respect to each of the constraint variables and/or the recommended changes to a user (e.g., via user device 516) for selection, by the user, of one or more of the recommended changes. In such embodiments, the constraint modifier modifies one or more of the constraint variables based on the user selection of one or more recommended changes to one or more of the constraint variables.

In some embodiments, constraint modifier 506 is configured to determine a gradient threshold value using one or more user-selected recommended changes and the gradient of the cost associated therewith. In some embodiments, the gradient threshold value defines a gradient value by which constraint modifier 506 automatically (e.g., without user selection) selects, for a future optimization process, one or more recommended changes. For example, a first gradient of the cost for a first subplant to produce an amount of a first resource is $5/ton, a second gradient of the cost for a second subplant to produce an amount of a second resource is $10/ton, and a third gradient of the cost for a third subplant to produce a third resource is $15/ton. Based on a user selection of the corresponding subplants to produce a greater amount of the first resource and the second resource but not the third resource, constraint modifier 506 determines that a maximum gradient threshold value by which it may automatically select increased changes (e.g., changes which increase an amount of a resource produced) is $10/ton. As such, for future optimization processes, constraint modifier 506 may automatically select increased changes with gradients that are substantially equal to or less than $10/ton.

In another example, a first gradient of the cost for a first subplant to produce an amount of a first resource is $60/ton, a second gradient of the cost for a second subplant to produce an amount of a second resource is $50/ton, and a third gradient of the cost for a third subplant to produce a third resource is $25/ton. Based on a user selection of the corresponding subplants to produce a decreased amount of the first resource and the second resource but not the third resource, constraint modifier 506 determines that a minimum gradient threshold value by which it may automatically select decreased changes (e.g., changes which decrease an amount of a resource produced) is $25/ton. As such, for future optimization processes, constraint modifier 506 may automatically select changes with gradients that are substantially equal to or greater than $25/ton. It should be understood that the previous examples are intended not intended to be limiting. The parameters, such as number of user-selected changes and corresponding gradients, number of optimization processes, number of subplants, etc., by which constraint modifier 506 may determine gradient threshold values may be configurable based on user preference. For example, a user may desire that constraint modifier 506 must receive 100 user-selected changes and use the 100 received user-selected changes to determine a gradient threshold value (thus, potentially increasing the accuracy of the determined gradient threshold value with respect to the 100 received user-selected changes).

In some embodiments, high-level optimizer 504 is configured to receive an updated set of constraint variables from constraint modifier 506 included in asset allocator 302. High-level optimizer 504 may be configured to perform a second optimization of the cost function J(x) subject to the updated set of constraint variables to generate a second optimization result that achieves the load and/or cost curtailment selected for the updated set of constraint variables. Further, in some embodiments, the high-level optimizer 504 is configured to transmit the second optimization result to low-level optimizer 434 and/or a cost estimator 508.

In some embodiments, low-level optimizer 434 uses the second optimization result to generate control actions in order to operate building equipment (e.g., subplants 320)

according to the second optimization result. Such control actions may indicate an amount of load curtailment (e.g., load reduction). In some embodiments, the second optimization result is transmitted to building management system 406 for curtailment of resources usage due to the reduction of required load. For example, the second optimization result may determine that curtailing a required load may involve a reducing a chilled water load. As a result, a chiller subplant may implement this curtailment requirement by raising the set point temperature of the chilled water produced by the chiller subplant. In some embodiments, building management system 406 stores a list of predefined curtailment actions to perform based on an indicated amount of load curtailment received from central plant controller 400. In some embodiments, the amount of load curtailment is transmitted form a user device (e.g., a mobile phone, a terminal, a control panel) to building management system 406. Such curtailment actions may be used by building management system 406 to determine control signals for various building equipment to perform such curtailment actions. Examples of such curtailment actions may include, but are not limited to, raising all temperature setpoints by 1° F. based on a 1000 ton load curtailment, halting a dehumidification process and raising all temperature setpoints by 1° F. based on a 2000 ton load curtailment, halting a dehumidification process and raising all temperature setpoints by 2° F. based on a 3000 ton load curtailment, and halting all cooling loads generated by various building equipment based on a 4000 ton load curtailment. In some embodiments in which load curtailments are generated for both airside systems (e.g., airside system 130) and waterside systems (e.g., waterside system 120), similar curtailment actions are generated for both the airside system equipment and the waterside system equipment. For example, assume a 1000 ton load curtailment was received for both the waterside system 120 and the airside system 130. Accordingly, all temperature setpoints, for both waterside system 120 and airside system 130, are raised by 1° F.

In another example, the load curtailment may involve reducing a hot water load. As a result, a hot water subplant may implement this curtailment requirement by lowering the setpoint temperature of the hot water produced by the hot water subplant. Additionally, the load curtailment may involve reducing an electrical load used by the building. As a result, the building (e.g., via building management system 406 may implement this curtailment requirement by reducing the lighting resources consumed by the building (e.g., turning off on or more lights, dimming one or more lights, etc.).

In some embodiments, asset allocator 302 may include a cost estimator 508 configured to calculate a predicted cost savings value based on modified constraints used to perform a second optimization. Cost estimator 508 may be configured to receive the first optimization result and the second optimization result (performed using one or more modified constraints) from high-level optimizer 504. The cost estimator 508 may calculate a predicted cost savings value by subtracting the second optimization result from the first optimization result using the equation below:

$$\Delta C = C_1 - C_2$$

where $\Delta C$ represents cost savings in desired units (e.g., dollars, etc.), $C_1$ is the first predicted cost of the first optimization result using the initial constraint variables, and $C_2$ is the second predicted cost of the second optimization result using the modified constraint variables. In some embodiments, the predicted cost savings value may be transmitted to user device 516 via communications interface 436 for viewing by a user. In other embodiments, the predicted cost savings value may be stored in memory 410 for use by central plant controller 400. For example, the predicted cost savings value may be stored in memory 410 for use in data analysis (e.g., trend in cost savings over a predetermined time period, summation of cost savings over a predetermined time period, etc.).

Constraint Modifier Components

Figure 6:
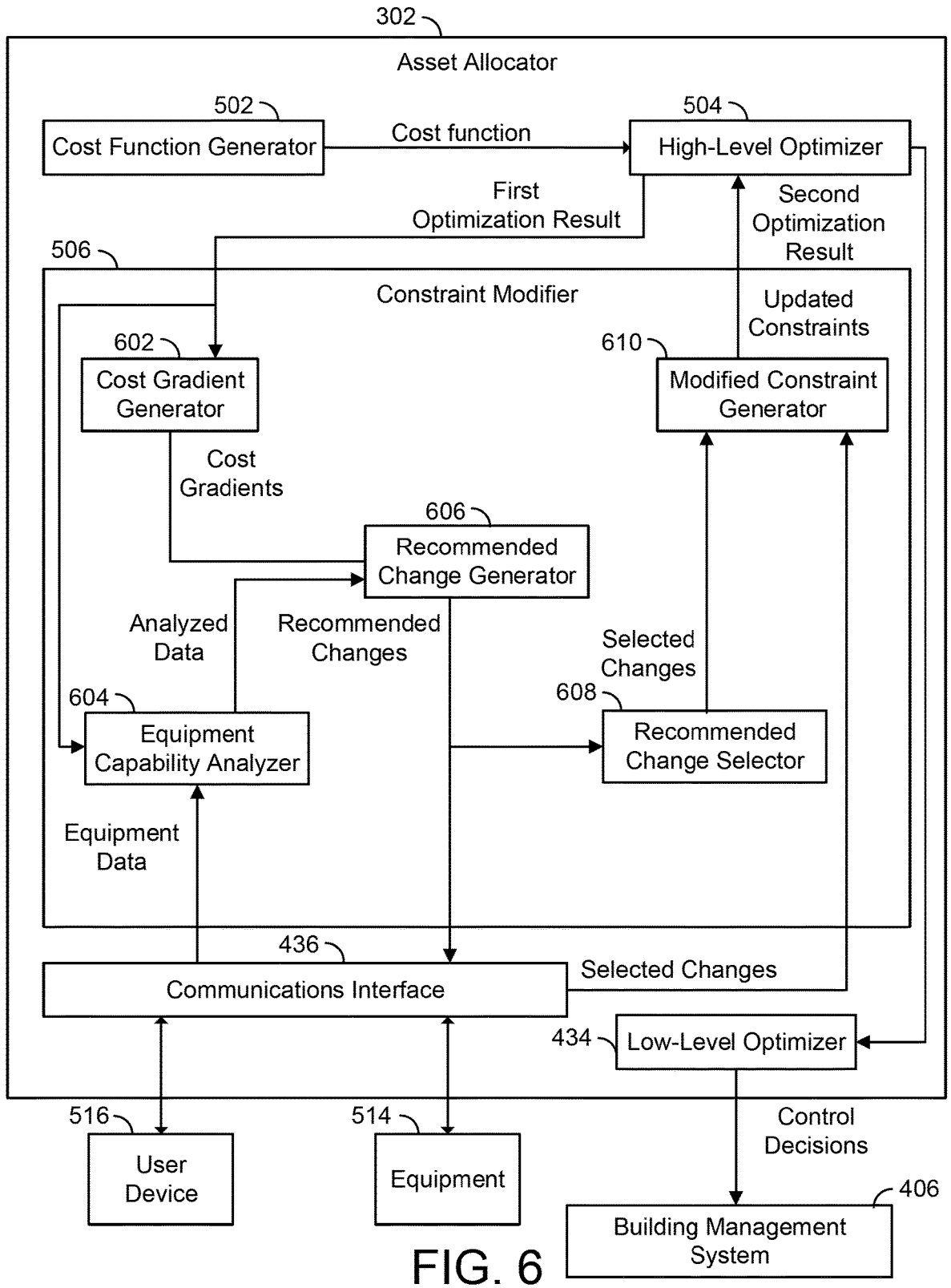
FIG. 6 is a block diagram of the constraint modifier included in the asset allocator of FIG. 5, according to an exemplary embodiment.

Referring now to FIG. 6, a detailed view of the components included in constraint modifier 506 as implemented in asset allocator 302 are shown, according to an exemplary embodiment. Constraint modifier 506 is shown to include a cost gradient generator 602 configured to generate a gradient of the cost with respect to a particular constraint variable, according to an exemplary embodiment. More specifically, in such embodiments, cost gradient generator generates a gradient of the cost function with respect a particular constraint variable at a particular operating point defined by the first operating point. In some embodiments, a gradient of the cost is a ratio of the change in cost as determined by the cost function with respect to a particular constraint variable to a change in a value defined by the constraint variable. In some embodiments, the gradient of the cost is a derivative (e.g., a slope) of the cost function with respect to the particular constraint variable. In some embodiments, the gradient of the cost is represented by the dual variable generated by high-level optimizer 504 in an optimization process. As used herein, the terms "cost gradient," "gradient of the cost," and "dual variable" are intended to be equal.

Constraint modifier 506 is shown to include an equipment capability analyzer 604 configured to analyze data of the one or more pieces of equipment 514 (included in central plant 200), according to an exemplary embodiment. Equipment capability analyzer 604 may communicate with equipment 514 to receive data relating to the capability of one or more pieces of equipment (e.g., pieces of equipment included in subplants 320) to produce a predetermined amount of a particular resource based on the first optimization result. In some embodiments, equipment capability analyzer 504 may retrieve the maximum amount of a corresponding resource (e.g., tons of chilled water, etc.) that can be produced by equipment 514. For example, equipment capability analyzer 604 may look at the required load based on a first optimization result and compare it to the ability of one or more pieces of equipment to produce the required amount. In some embodiments, equipment capability analyzer 604 may determine that one or more pieces of equipment may not be capable of producing the amount of a particular resource as define by the required load. Equipment capability analyzer 604 may output the analyzed equipment data to recommended change generator 606.

Still referring to FIG. 6, constraint modifier 506 is shown to include a recommended change generator 606 configured to generate one or more recommended changes to one or more constraint variables for use in a second optimization process, according to an exemplary embodiment. In some embodiments, recommended change generator 606 generates one or more recommended changes to one or more constraint variables based on one or more cost gradients transmitted by cost gradient generator 602 and/or analyzed equipment data transmitted by equipment capability analyzer 604. Recommended change generator 606 may output one or more recommended changes to a recommended change selector 608 or a user device 516 (via communications interface 436) for selection of the one or more recommended changes.

In some embodiments, recommended change generator 606 recommends changes to one or more constraint variables based on the ability for equipment 514 to produce an amount of one or more resources required by the building. In some embodiments, recommended change generator 606 uses analyzed data transmitted by equipment capability analyzer 604 to determine if equipment 514 is capable of generating the required amount of a particular resource as defined by the required load of the first optimization. In some embodiments in which equipment 514 is not capable of producing the required amount of a particular resource, recommended change generator 606 may determine an amount of load curtailment required in order to reduce the required load to an amount capable of production by equipment 514 by subtracting the maximum amount of resource production from the required load. For example, recommended change generator 606 may recommend reducing the amount of required load to be less than or equal to the maximum amount of the corresponding resource that can be produced at a particular time.

In some embodiments, recommended change generator 606 generates recommended changes based on the gradient of the cost with respect to each of the constraint variables. In some embodiments, recommended change generator 606 recommends changes to one or more constraint variables with a determined cost gradient that is higher than a predetermined threshold value. For example, if the cost gradient to produce a required amount of chilled water is greater than a predetermined threshold value, then recommended change generator 606 may recommend a reduction in the one or more constraints that represent the amount of chilled water. In other embodiments, recommended change generator 606 recommends changes to one or more constraint variables with a determined cost gradient that is lower than a predetermined threshold value. For example, if the cost gradient to produce a required amount of chilled water is less than a predetermined threshold value, then recommended change generator 606 may recommend an increase in the one or more constraints that represents the amount of chilled water (e.g., in order to produce more chilled water at a lower cost that may be stored in storage 330 and used at a later time).

In some embodiments, recommended change generator 606 outputs one or more recommended changes to communications interface 436 and/or a recommended change selector 608. The communications interface 436 may communicate with a user via a user device 516 (e.g., a cellular phone, computer, etc.). In some embodiments, a user selects one or more recommended changes to the one or more constraint variables using user device 516. In other embodiments, recommended change selector 608 is configured to select one or more recommended changes to the one or more constraint variables. Further, in other embodiments, recommended change selector 608 selects one or more recommended changes to the one or more constraint variables based on the greatest cost savings and/or largest reduction in load required by the building.

Still referring to FIG. 6, constraint modifier 506 is shown to include modified constraint generator 610 configured to update one or more constraint variables based on selection of one or more recommended changes, according to an exemplary embodiment. In some embodiments, modified constraint generator 610 updates one or more of the constraint variables based on a user selection (e.g., using user device 516) of one or more of the recommended changes generated by recommended change generator 606. In other embodiments, modified constraint generator 610 updates one or more of the constraint variables based on automatic selection of one or more of the recommended changes by recommended change selector 608. Modified constraint generator 610 is shown to output update constraints to high-level optimizer 504 for use in a second optimization process.

Method of Controlling Building Environment

Figure 7:
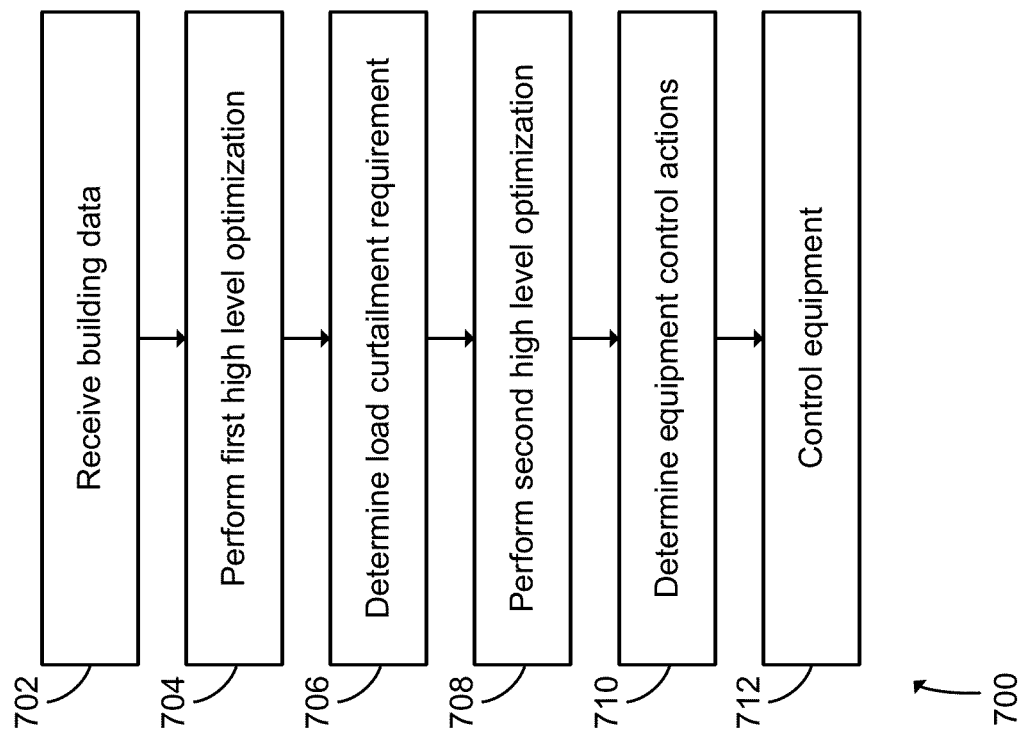
FIG. 7 is a flowchart illustrating a process of controlling a building environment with high-level optimization, according to an exemplary embodiment.

Referring now to FIG. 7, a flowchart of a process 700 for controlling building equipment (e.g., subplants 320) with load curtailment is shown, according to an exemplary embodiment. Process 700 may be performed by one or more components of central plant controller 400. Process 700 is shown to begin with step 702. Step 702 may involve asset allocator 302 receiving building data from various components included in central plant controller 400. In some embodiments, asset allocator 302 receives load and rate predictions from load/rate predictor 422. In other embodiments, asset allocator 302 receives incentive predictions from incentive estimator 420. In some embodiments, the building data received by asset allocator 302 defines the required load by the building in which asset allocator 302 is implemented.

Process 700 is shown to continue with step 704. Step 704 may involve performing a high-level optimization. In some embodiments, as previously discussed, the high-level optimization is executed by asset allocator 302. In some embodiments, step 704 involves performing a first optimization based on a first set of constraint variables defined by the required load received in step 702. In some embodiments, step 704 involves high-level optimizer 504 driving the cost defined by the cost function $J(x)$ to a minimum value subject to a set of constraints. Further, in some embodiments, step 704 involves high-level optimizer 504 generating at least one dual variable by calculating the partial derivative of the cost function $J(x)$ with respect to each constraint variable at the optimal operating point defined by the first optimization result.

Still referring to FIG. 7, Process 700 is shown to continue with step 706. At step 706, constraint modifier 506 may determine whether curtailment of required load of the building is required by analyzing the capability for one or more subplants to produce an amount of one or more resources defined by the first optimization result. For example, the demand of resources to be produced by central plant 200 may be too great for the capability of central plant 200. In some embodiments, the loads required by the building may be curtailed in order reduce the required amount of one or more particular resources to an amount achievable by one or more subplants. For example, the required amount of chilled water may be too great for the chilled water subplant (e.g., chiller 322) to produce may be reduced.

In some embodiments, step 706 involves determining whether curtailment of required load of the building by determining that a cost to produce an amount of one or more resources defined by the first optimization result is greater than a predetermined value. As a result, in some embodiments, the loads required by the building are curtailed in order to reduce the cost to produce an amount of one or more resources to a value substantially equal to or less than a predetermined value. In other embodiments, step 706 involves determining that a cost savings is associated with curtailing the load required by the building to produce one or more resources. As will be described in greater detail below with reference to FIG. 8, step 706 may involve modifying the first set of constraint variables used by asset allocator 302 in the first high-level optimization to generate an updated set of constraint variables for use in a second high level optimization performed by asset allocator 302.

Process 700 is shown to continue with step 708. Step 708 may involve high-level optimizer 504 performing a second optimization of the cost function J(x) subject to the second set of constraints determined in step 706. In some embodiments, step 708 may involve high-level optimizer 504 performing a second optimization of the cost function J(x) subject to the updated set of constraint variables to generate a second optimization result that achieves the load and/or cost curtailment selected for the updated set of constraint variables. Further, in some embodiments, step 708 may involve the high-level optimizer 504 transmitting the second optimization result to low-level optimizer 434 and/or a cost estimator 508.

Process 700 is shown to continue with step 710. Step 710 may involve low-level optimizer 434 determining control actions based on a second optimization result generated by asset allocator 302 in step 708. Process 700 is shown conclude with step 712. In some embodiments, step 712 may involve controlling various building equipment using the control actions determined in step 710. In some embodiments, step 712 involves controlling various building equipment to achieve the load curtailment requirements determined in step 706.

High-Level Optimization with Load Curtailment

Figure 8:
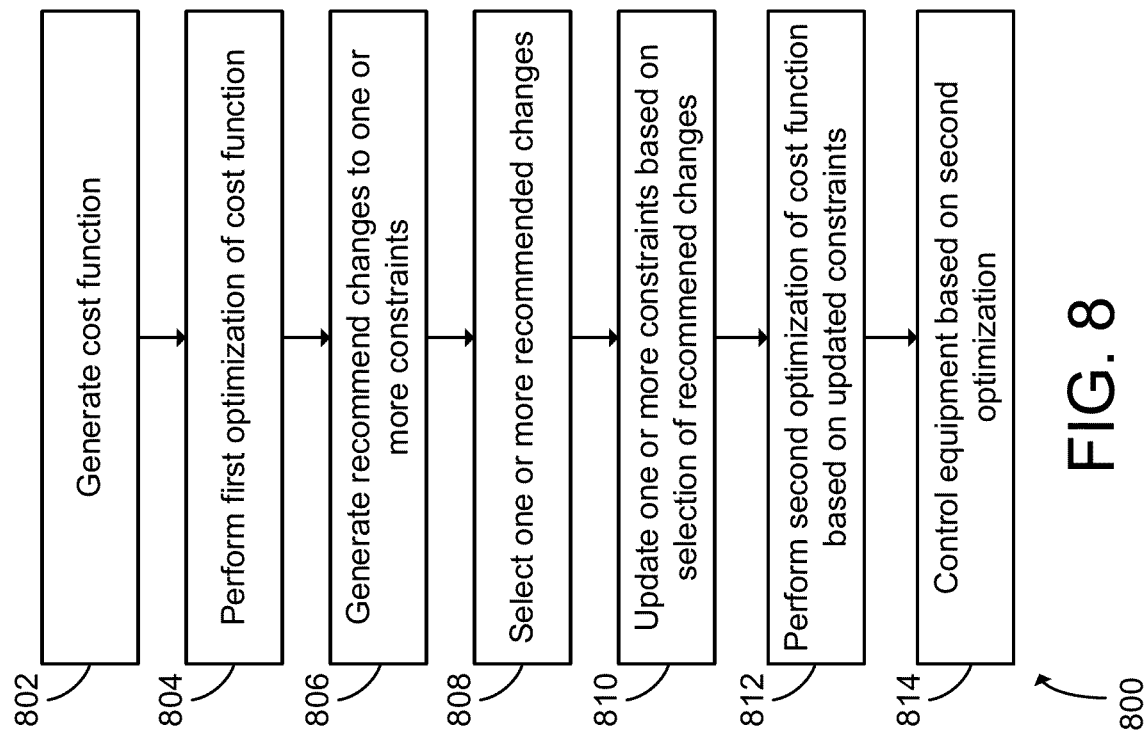
FIG. 8 is a flowchart illustrating a process of controlling a building environment implemented with the asset allocator of FIG. 5, according to an exemplary embodiment.

Referring now to FIG. 8, a process 800 is shown illustrating the process of optimization with curtailment, according to an exemplary embodiment. Process 800 may be implemented for use with asset allocator 302. Process 800 is shown to begin with step 802. Step 802 may involve generating a cost function J(x). In some embodiments, the cost function is generated by cost function generator 502 in step 802. As previously described, generating a cost function J(x) may involve expressing economic cost as a function of the control decisions made by asset allocator 302. Generating the cost function J(x) may involve collecting the cost of resources purchased from sources 310, as well as the revenue generated by selling resources to resource purchasers 341 or energy grid 342 or participating in incentive programs.

Process 800 is shown to proceed with step 804. Step 804 may involve performing a first optimization of the cost function subject to a first set of constraints. In some embodiments, the first set of constraints is defined by a required load value of the building in which process 800 is implemented. In some embodiments, high-level optimizer 504 performs the first optimization in step 804. In some embodiments, the first optimization results in defining a first optimization result. The first optimization result may define the first values of decision variables. In some embodiments, the first values of decision variables may include the amount of resources consumed and/or produced by the subplants included in a central plant (e.g., central plant 200). In some embodiments, the first values of decision variables may be outputted by high-level optimizer 504 to constraint modifier 506 in step 804.

Process 800 is shown to proceed with step 806. Step 806 may involve generating recommended changes to one or more constraints based on the result of the first optimization performed in step 804. In some embodiments, step 806 involves cost gradient generator 602 generating a gradient of the cost with respect to a particular constraint variable. In some embodiments, step 804 involves cost gradient generator 602 generating a gradient of the cost for each of the constraint variables from the dual variables generated by high-level optimizer 504 in the optimization process of step 804. In some embodiments, step 806 involves presenting each generated gradient of the cost to a user (e.g., via user device 516).

Further, in some embodiments, step 806 may involve equipment capability analyzer 604 analyzing data relating to the capability of one or more pieces of equipment (e.g., pieces of equipment included in subplants 320) to produce a predetermined amount of a particular resource based on the first optimization result of step 804. In some embodiments, step 806 may involve equipment capability analyzer 504 retrieving the maximum amount of a corresponding resource (e.g., tons of chilled water, etc.) that can be produced by equipment 514. In some embodiments, step 806 may involve equipment capability analyzer 604 determining that one or more pieces of equipment may not be capable of producing the amount of a particular resource as defined by the first optimization result of step 804.

Still referring to FIG. 8, step 806 may involve recommended change generator 606 generating one or more recommended changes to one or more constraint variables for use in a second optimization process. In some embodiments, step 806 may involve recommended change generator 606 generating one or more recommended changes to one or more constraint variables based on one or more cost gradients transmitted by cost gradient generator 602 and/or analyzed equipment data transmitted by equipment capability analyzer 604. Recommended change generator 606 may output one or more recommended changes to a recommended change selector 608 or a user device 516 (via communications interface 436) in step 806.

Process 800 is shown to continue with step 808. Step 808 may involve selecting one or more of the recommended changes to the one or more constraints generated in step 806. In some embodiments, a user selects one or more recommended changes to the one or more constraint variables using user device 516 in step 808. In such embodiments, a gradient threshold value is determined using one or more user-selected recommended changes and the gradient of the cost associated therewith. Further, in some embodiments, step 808 may involve recommended change selector 608 selecting one or more recommended changes to the one or more constraint variables based the determined gradient threshold value. In some embodiments, step 808 may involve recommended change selector 608 selecting one or more recommended changes to the one or more constraint variables based on the greatest cost savings and/or largest reduction in load required by the building.

In some embodiments, step 808 involves automatically selecting one or more recommended changes to the one or more constraints generated in step 806. In such embodiments, constraint modifier 506 automatically selects the one or more changes based on a minimum gradient threshold value. Such a minimum gradient threshold value defines a minimum gradient value by which the controller selects the one or more changes. As previously described with reference to FIG. 5, the minimum gradient threshold value is a user-defined value that is inputted by a user.

In some embodiments, step 808 involves presenting one or more recommended changes to the one or more constraints generated in step 806. In some embodiments, the user is presented with the cost gradient, the one or more recommended changes, and/or the predicted savings based on selection of the one or more recommended changes. As such, the user selects the one or more recommended changes.

In some embodiments, step 808 involves presenting the gradient of the cost to the user. As such, the user selects one or more changes to the one or more constraints based on the gradient of the cost. In such embodiments, constraint modifier 506 does not recommend changes based on the cost gradient. For example, a user is presented with a gradient of the cost for a subplant to produce an amount of a resource being $5/ton. With this information, the user may select to increase or decrease an amount of the produced resource.

Still referring to FIG. 8, process 800 is shown to proceed with step 810. Step 810 may involve updating one or more constraints based on the selected recommended changes. In some embodiments, step 810 may involve modified constraint generator 610 updating one or more constraint variables based on selection of one or more recommended changes, according to an exemplary embodiment. In some embodiments, step 810 involves modified constraint generator 610 updating one or more of the constraint variables based on a user selection (e.g., using user device 516) of one or more of the recommended changes generated by recommended change generator 606. In other embodiments, step 810 involves modified constraint generator 610 updating one or more of the constraint variables based on automatic selection of one or more of the recommended changes by recommended change selector 608. Step 810 may involve modified constraint generator 610 outputting the updated constraints to high-level optimizer 504 for use in a second optimization process.

Process 800 is shown to continue with step 812. Step 812 may involve performing a second optimization of the cost function J(x) subject to the updated constraints generated in step 810. In some embodiments, step 812 may involve high-level optimizer 504 performing a second optimization of the cost function J(x) subject to the updated set of constraint variables to generate a second optimization result that achieves the load and/or cost curtailment selected for the updated set of constraint variables. Further, in some embodiments, step 810 may involve the high-level optimizer 504 transmitting the second optimization result to low-level optimizer 434 and/or a cost estimator 508.

In some embodiments, step 812 may involve using the second optimization result to generate a predicted cost savings value between the second optimization result and the first optimization result. In some embodiments, cost estimator 508 may be configured to receive the first optimization result and the second optimization result from high-level optimizer 504 in step 812. In step 912, the cost estimator 508 may calculate a predicted cost savings value by subtracting the second optimization result from the first optimization result. In some embodiments, the predicted cost savings value may be transmitted to user device 516 via communications interface 436 for viewing by a user in step 812. In other embodiments, the predicted cost savings value is stored in memory 410 for use by central plant controller 400 in step 812.

Still referring to FIG. 8, Process 800 is shown to conclude with step 814. Step 814 may involve controlling building equipment based on the second optimization. In some embodiments, step 814 involves low-level optimizer 434 using the second optimization result to generate control actions in order to operate building equipment (e.g., subplants 320) according to the second optimization result. In some embodiments, step 814 involves the second optimization result being transmitted to building management system 406 for curtailment of resources usage due to the reduction of required load. For example, the second optimization result may determine that curtailing a required load may involve a reducing a chilled water load. As a result, a chiller subplant may implement this curtailment requirement by raising the set point temperature of the chilled water produced by the chiller subplant.

In another example, the load curtailment may involve reducing a hot water load. As a result, a hot water subplant may implement this curtailment requirement by lowering the setpoint temperature of the hot water produced by the hot water subplant. Additionally, the load curtailment may involve reducing an electrical load used by the building. As a result, the building (e.g., via building management system 406 may implement this curtailment requirement by reducing the lighting resources consumed by the building (e.g., turning off on or more lights, dimming one or more lights, etc.).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller, comprising:
a processing circuit comprising one or more processors and memory storing instructions that, when executed by the one or more processors, cause the one or more processors to perform operations comprising:
performing a first optimization of an objective function subject to a first constraint to generate a first optimization result, the first constraint defining a first value of a constraint variable;
determining whether a gradient of an output of the objective function with respect to the constraint variable exceeds a threshold value;
in response to a determination that the gradient exceeds the threshold value, modifying the constraint variable to have a modified value;
performing a second optimization of the objective function subject to a second constraint to generate a second optimization result, the second constraint defining the modified value of the constraint variable; and
operating equipment in accordance with the second optimization result.

2. The controller of claim 1, wherein the first optimization result comprises first values for dual variables representing the gradient.

3. The controller of claim 1, wherein the constraint variable comprises a required load variable defining a amount of a resource required by a building.

4. The controller of claim 1, wherein modifying the constraint variable comprises modifying a required load variable to reduce an amount of a resource required by a building such that a cost resulting from the second optimization of the objective function is less than a cost resulting from the first optimization of the objective function.

5. The controller of claim 1, wherein the operations further comprise recommending a change to the constraint variable in response to a determination that an amount of a resource required by a building exceeds a production amount of the resource capable of being produced by a subplant during a portion of a time period.

6. The controller of claim 1, wherein the operations further comprise:
presenting, on a user device, the gradient and a recommended change to the constraint variable; and
modifying the constraint variable to have the modified value based on a user selection of the recommended change.

7. The controller of claim 1, wherein the operations further comprise determining the threshold value based on a user selection of one or more changes to the constraint variable.

8. The controller of claim 1, wherein the operations further comprise determining the modified value of the constraint variable based on a comparison between the gradient and the threshold value.

9. The controller of claim 1, wherein the operations further comprise:
presenting, on a user device, the gradient; and
receiving, via the user device, a user input defining the modified value of the constraint variable.

10. A method comprising:
performing a first optimization of an objective function subject to a first constraint to generate a first optimization result, the first constraint defining a first value of a constraint variable;
displaying a gradient of an output of the objective function with respect to the constraint variable to a user;
receiving a user request to modify the constraint variable;
modifying the constraint variable to have a modified value in response to the user request;
performing a second optimization of the objective function subject to a second constraint to generate a second optimization result, the second constraint defining the modified value of the constraint variable; and
operating equipment in accordance with the second optimization result.

11. The method of claim 10, wherein performing the first optimization further comprises generating the first value for a dual variable, the dual variable representing the gradient with respect to the constraint variable.

12. The method of claim 10, wherein modifying the constraint variable is based on a change to the constraint variable indicated in the user request.

13. The method of claim 10, further comprising:
determining a gradient threshold value based on a user selection of one or more changes to the first or second constraint variable; and
comparing the first or second constraint to the gradient threshold value.

14. The method of claim 10, wherein modifying the constraint variable further determining the modified value by comparing the gradient with a threshold.

15. The method of claim 10, wherein modifying the constraint variable further is performed in accordance with a user input defining the modified value.

16. A control system for building equipment, the control system comprising a controller, comprising:
a processing circuit comprising one or more processors and memory storing instructions that, when executed by the one or more processors, cause the one or more processors to perform operations comprising:
performing a first optimization of an objective function subject to a first constraint to generate a first optimization result, the first constraint defining a first value of a constraint variable;
determining a gradient of an output of the objective function with respect to the constraint variable based on the first optimization;
modifying the constraint variable to have a modified value based on a comparison between the gradient and a threshold value;
performing a second optimization of the objective function subject to a second constraint to generate a second optimization result, the second constraint defining the modified value of the constraint variable; and
operating equipment in accordance with the second optimization result.

17. The control system of claim 16, wherein the constraint variable defines an amount of a resource demanded by the building equipment.

18. The control system of claim 16, wherein modifying the constraint variable comprises modifying a load variable to reduce an amount of one or more resources required by the building equipment such that a cost resulting from the second optimization of the objective function is less than a cost resulting from the first optimization of the objective function.

19. The control system of claim 16, wherein the operations further comprise recommending a change to the constraint variable in response to a determination that an amount of a resource required by the building equipment exceeds a production amount of the resource capable of being produced during a portion of a time period.

20. The control system of claim 16, wherein the memory stores one or more predetermined control actions used to determine a control signal associated with a curtailment action based on an amount of load curtailment, the control signal configured to control the building equipment according to the curtailment action.

* * * * *